(12) United States Patent
Lee

(10) Patent No.: US 11,497,038 B2
(45) Date of Patent: Nov. 8, 2022

(54) METHOD AND SYSTEM FOR END-TO-END NETWORK SLICING MANAGEMENT SERVICE

(71) Applicant: Verizon Patent and Licensing Inc., Basking Ridge, NJ (US)

(72) Inventor: Jay J. Lee, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 9 days.

(21) Appl. No.: 17/151,828

(22) Filed: Jan. 19, 2021

(65) Prior Publication Data
US 2022/0232579 A1 Jul. 21, 2022

(51) Int. Cl.
| | | |
|---|---|---|
| H04W 16/14 | (2009.01) |
| H04W 72/12 | (2009.01) |
| H04W 24/08 | (2009.01) |
| H04L 67/30 | (2022.01) |
| H04L 41/5019 | (2022.01) |
| H04L 67/141 | (2022.01) |
| H04W 16/10 | (2009.01) |
| H04W 28/02 | (2009.01) |
| H04L 41/0893 | (2022.01) |

(52) U.S. Cl.
CPC ..... *H04W 72/1231* (2013.01); *H04L 41/0893* (2013.01); *H04L 41/5019* (2013.01); *H04L 67/141* (2013.01); *H04L 67/30* (2013.01); *H04W 16/10* (2013.01); *H04W 16/14* (2013.01); *H04W 24/08* (2013.01); *H04W 28/0268* (2013.01)

(58) Field of Classification Search
None
See application file for complete search history.

(56) References Cited

U.S. PATENT DOCUMENTS

| | | | |
|---|---|---|---|
| 10,523,914 B1 * | 12/2019 | Phillips | H04N 19/146 |
| 2020/0154292 A1 * | 5/2020 | Bor-Yaliniz | H04L 41/5025 |
| 2020/0221346 A1 * | 7/2020 | Park | H04W 28/0268 |
| 2020/0328944 A1 * | 10/2020 | Zhang | H04W 84/18 |

FOREIGN PATENT DOCUMENTS

WO   WO-2021028027 A1 *   2/2021   ......... H04L 41/5019

\* cited by examiner

*Primary Examiner* — Ajit Patel

(57) ABSTRACT

A method, a device, and a non-transitory storage medium are described in which an end-to-end network slice management service is provided. The service may map application services to network slices based on network profiles, and may generate mapping information. The mapping information may indicate network slice portion-to-application service mappings, and end-to-end mappings between a network slice and the application service. The service may calculate metric values pertaining to networks and associated network slices, and calculate prospective metric values for the networks and network slices based on the metric values. The service may estimate resources allocation values associated with resources to support the prospective metric values based on the prospective metric values and the mapping information. The service may calculate a schedule and assignment of the resources, and provide them to the networks.

20 Claims, 7 Drawing Sheets

METHOD AND SYSTEM FOR END-TO-END NETWORK SLICING MANAGEMENT SERVICE

BACKGROUND

Development and design of networks present certain challenges from a network-side perspective and an end device perspective. For example, Centralized Radio Access Network (C-RAN), Open Radio Access Network (O-RAN), and split RAN architectures have been proposed to satisfy the increasing complexity, densification, and demands of end device application services of a future generation network.

DETAILED DESCRIPTION

Figure 1:
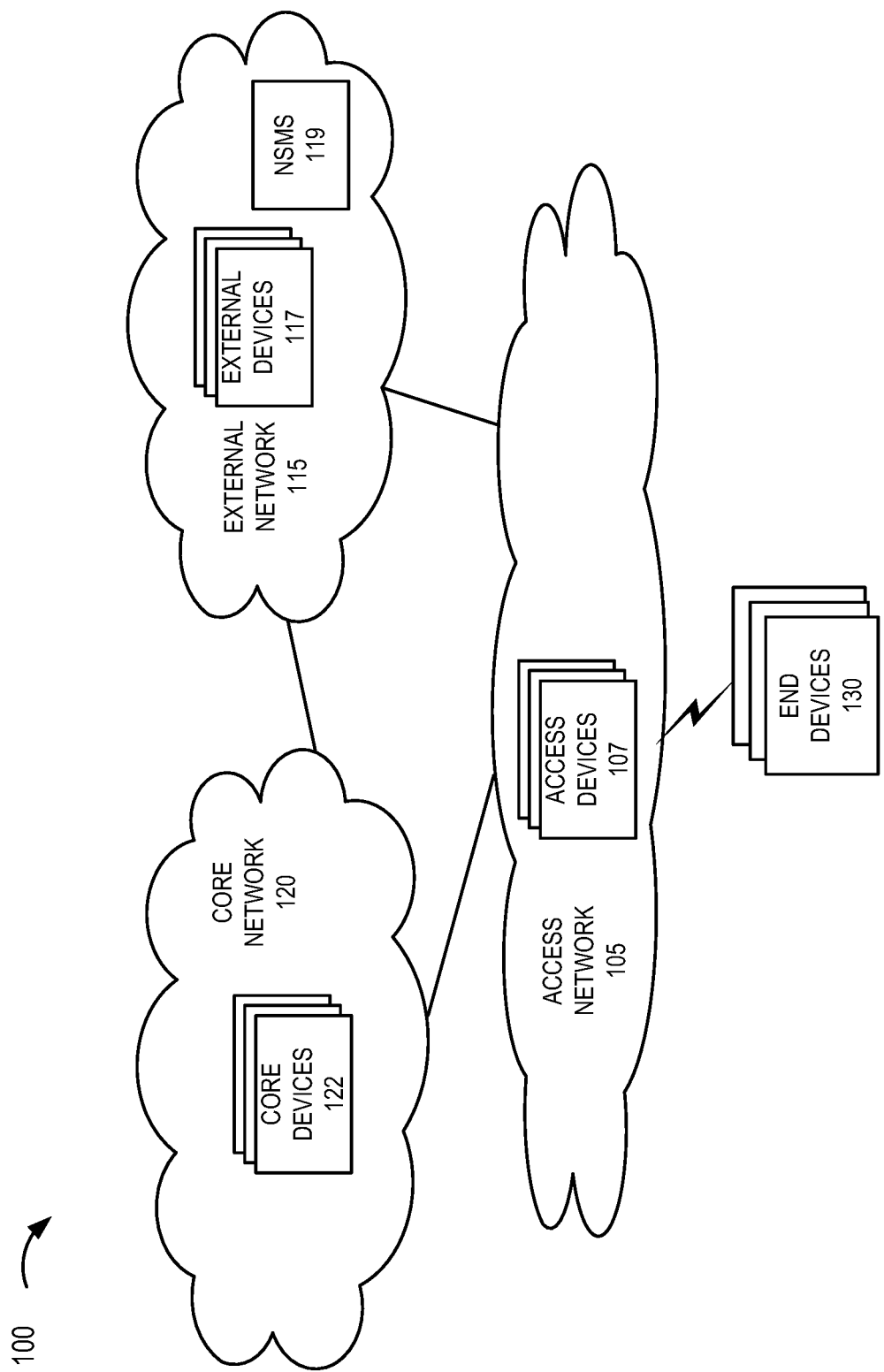
FIG. 1 is a diagram illustrating an exemplary environment in which an exemplary embodiment of an end-to-end network slice management service may be implemented.

The following detailed description refers to the accompanying drawings. The same reference numbers in different drawings may identify the same or similar elements. Also, the following detailed description does not limit the invention.

The performance of a network slice may be reliant on multiple networks, such as a RAN, a core network, and perhaps an application service layer network, as well as various criteria and factors, such as rendering the network slice, carrier aggregation of a device, radio quality, cell-level congestion, latency associated with the core network, Transmission Control Protocol (TCP) flow control, aggregation point for the traffic being sourced for the network slice, reaction to dynamism in the RAN, the core network, and the application layer network, among other things.

A network slice management system (NSMS) may be used to provision and manage various network slices that may support a diverse array of application services and associated performance metric, service level agreement (SLA), and quality of service (QoS) requirements. However, the network slices and data traffic are dynamic in nature. For example, there may be link and node failures, service attacks, variability of radio channel quality, unpredictable mobile user activities in terms of time and/or location, and other events that may impact the performance of the network slice and associated requirements. Additionally, network slices may be configured according to a one-to-one basis in which each application service has its own dedicated network slice, which may result in too many network slices and significant overhead in the network. Also, network slices are configured based on limited RAN resources (e.g., limited radio spectrum), core network resources, and application layer network resources.

Given the underlying dynamism, the ability to properly allocate network resources to support network slices and associated requirements, as well as other factors, such as the interworking between end devices, the RAN, the core network, and an application layer network, is problematic. For example, in the RAN, network slicing interacts with end devices and the core network and shares finite radio spectrum among RAN slices in view of unpredictable mobility of the end devices, and variations in radio channel quality, application throughput, and network loads, among other things. In the core network, network slicing interacts with the RAN and an application layer network, shares core network resources, optimizes the core network via various networking techniques, such as cloud networking, software defined networking (SDN), and network function virtualization (NFV), and may minimize dependencies between the RAN and the core network.

According to exemplary embodiments, an end-to-end network slice management service is described. According to an exemplary embodiment, the end-to-end network slice management service may be implemented by an NSMS. The NSMS may manage the network slice from end-to-end. According to an exemplary embodiment, the end-to-end network slice management service may provide a mapping of K:L between application services (also referred to as "vertical services") and RAN slices (e.g., where K and L may be any integer), and a mapping of L:M between the RAN slices and the core network slices (e.g., where L and M may be any integer). According to such an exemplary embodiment, the end-to-end network slice management service may manage a mapping of K:L:M for vertical services, RAN slices, and core network slices, respectively. According to an exemplary embodiment, the K:L:M mapping may not correspond to a 1:1:1 mapping. According to other exemplary embodiments, the K:L:M mapping may correspond to a 1:1:1 mapping.

According to still other exemplary embodiments, the mapping may include a portion of the network slice associated with an application layer network. For example, there may be mapping between core network slices and application layer network slices, such as M:N (e.g., where M and N may be any integer). According to such an exemplary embodiment, the end-to-end network slice management service may manage a mapping of K:L:M:N for vertical services, RAN slices, core network slices, and application layer slices. The K:L:M:N may or may not correspond to a 1:1:1:1 mapping. According to an exemplary embodiment, the K:L:M and K:L:M:N mappings may include a mapping to an intermediary network (e.g., x-haul network, transport network, or other type of network).

According to an exemplary embodiment, the end-to-end network slice management service may include a network slice profile service, a metric predictor service, a resource predictor service, a mapping service, and a resource scheduler service, as described herein. For example, the end-to-end network slice management service may address various aspects of dynamic network slices, such as network service profiles; metric collection, estimation, and prediction; resource collection, estimation, and prediction; end-to-end mapping among vertical services, RAN slices, core slices, and network slice resource scheduling. As an example, in the RAN, radio resources may be allocated in time with time-division multiplexing (TDM), or in frequency with frequency-division multiplexing (FDM), or in space with space-division multiplexing (SDM), or some combination thereof, using centralized or decentralized dynamic scheduling across network slices. Additionally, in the core network, core resources may be allocated to core slices in a fair manner based on the requirements of the operators and may use various approaches, such as first-in-first-out (FIFO), round-robin, weighted round robin (WRR), deficit round robin (DRR), weighted fair queueing (WFQ), stochastic fair queueing (SFQ), and/or the like.

In view of the foregoing, the end-to-end network slice management service may provide end-to-end management of network slices and underlying resources based on predictive analytics, mapping, and scheduling measures. In this way, service level agreements, user experiences, performance metric parameters and values, and/or QoS, for example, may be satisfied despite the dynamic nature and unique characteristics associated with the network slices and the underlying networks. The end-to-end network slice management service may also provide the ability to dynamically adapt to traffic loads for customized slices. Additionally, the service also provides isolation between profile-based RAN slices, between profile-based core slices, between profile-based RAN slices and profile-based core slices, etc., thus permitting separate management of RAN, core, and/or other network slicing. This isolation may enable new products and services to be brought to market quickly, because new technologies or architectures can be launched on isolated slices to meet the demands and requirements of these new products and services. Further, the service may improve potential security issues because security attacks and/or issues on a slice may be contained within such slice and may not spread to other slices.

FIG. 1 is a diagram illustrating an exemplary environment 100 in which an exemplary embodiment of the end-to-end network slice management service may be implemented. As illustrated, environment 100 includes access network 105, an external network 115, and a core network 120. Access network 105 includes access devices 107 (also referred to individually or generally as access device 107). External network 115 includes external devices 117 (also referred to individually or generally as external device 117) and an NSMS 119. Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. For example, according to other exemplary embodiments, NSMS 119 may be situated in access network 105, core network 120, or both. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120. According to an exemplary embodiment, access network 105 may be configured to support or provide the end-to-end network slice management service, as described herein.

Access network 105 may include different and multiple functional splitting, such as options 1, 2, 3, 4, 5, 6, 7, or 8 that relate to combinations of access network 105 and core network 120 including an Evolved Packet Core (EPC) network and/or an NG core (NGC) network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), CU and DU, interface splitting (e.g., F1-U, F1-C, E1, Xn-C, Xn-U, X2-C, Common Public Radio Interface (CPRI), etc.) as well as other types of network services, such as DC or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN gNB (O-gNB), O-RAN eNB (O-eNB)), a 5G ultra-wide band (UWB) node, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device.

According to various exemplary implementations, access device 107 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), 2D beamforming, antenna spacing, tilt (relative to the ground), radiation pattern, directivity, elevation, planar arrays, and so forth. Depending on the implementation, access device 107 may provide a wireless access service at a cell, a sector, a sub-sector, carrier, and/or other configurable level.

External network 115 may include one or multiple networks of one or multiple types and technologies. For example, external network 115 may be implemented to include a service or an application-layer network, a cloud network, a private network, a public network, a MEC network, a fog network, the Internet, a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application, service, or asset (also referred to as an "application service"). According to an exemplary embodiment, external network 115 may be configured to support or provide the end-to-end network slice management service, as described herein.

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.).

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services (e.g., factory automation, advanced telemedicine applications, etc.).

NSMS 119 may include a network device that provides the end-to-end network slice management service. For example, NSMS 119 may manage network slices, which may be supported by the various networks of environment 100, that provide various application/vertical services to end devices 130. As described herein, the end-to-end network slice management service may include a network slice profile service, a metric predictor service, a resource predictor service, a mapping service, and a resource scheduler service. The end-to-end network slice management service may provide that multiple application services, which may differ according to performance metric requirements, QoS requirements, SLA requirements, and/or other requirements, may be grouped together and provided via a same network slice. NSMS 119 is described further below.

Core network 120 may include one or multiple networks of one or multiple network types and technologies. Core network 120 may include a complementary network of access network 105. For example, core network 120 may be implemented to include an NGC network, an EPC of an LTE network, an LTE-A network, and/or an LTE-A Pro network, a future generation core network (e.g., a 6G or beyond core network, etc.), and/or another type of core network. According to an exemplary embodiment, core network 120 may be configured to support or provide the end-to-end network slice management service, as described herein.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130. End device 130 may obtain various application/vertical services via network slices managed by the end-to-end network slice management service, as described herein.

Figure 2:
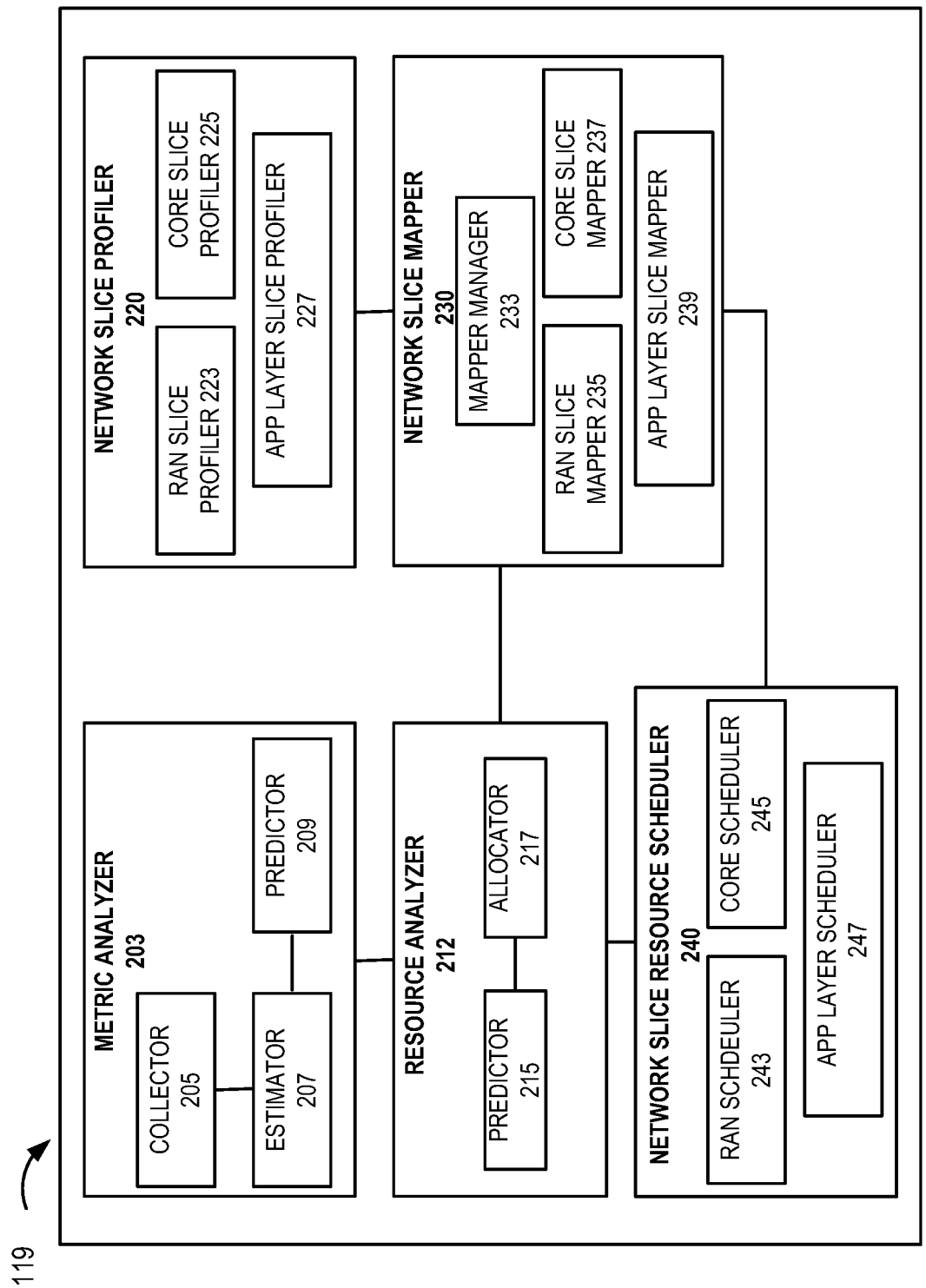
FIG. 2 is a diagram illustrating an exemplary embodiment of a network slice management system.

FIG. 2 is a diagram illustrating exemplary components of an exemplary embodiment of NSMS 119. As illustrated, NSMS 119 may include a metric analyzer 203, a resource analyzer 212, a network slice profiler 220, and a network slice mapper 230, and a network slice resource scheduler 240. According to other exemplary embodiments, NSMS 119 may include additional, fewer, and/or different components. Additionally, as illustrated, NSMS 119 may include links. A link may provide a communicative link between two or more components in which data may be communicated. For example, the link may be implemented as a hardware link (e.g., a bus, a shared memory space, etc.), a software link (e.g., inter-process communication (IPC), etc.) or some other type of communicative link (e.g., an application programming interface (API), a wired connection, an optical connection, a wireless connection, etc.). The number, type, and arrangement of components and links are exemplary.

Metric analyzer 203 may include logic that calculates and predicts metric values of metrics for a future time period. According to various exemplary embodiments, the metrics may pertain to performance metrics associated with a network (e.g., access network 105, external network 115, core network 120, a network slice, a portion of a network slice (e.g., a RAN slice, a core slice, etc.), metrics pertaining to end device 130 (e.g., mobility (e.g., velocity, location, speed, direction, etc.), requested application service, etc.), and/or other types of metrics that may be relevant to provision and manage network slices. Metric analyzer 203 may provide prediction information to other components of NSMS 119, as described herein.

As illustrated, metric analyzer 203 may include a collector 205, an estimator 207, and a predictor 209. Collector 205 may include logic that obtains and ingests metric information. For example, the metric information may relate to a network (e.g., access network 105, core network 120, external network 115), a network device (e.g., access device 107, core device 122, external device 117), a communication link (e.g., wireless, wired, optical, uplink, downlink, end-to-end, a segment or a portion of a connection, etc.), end device 130, and/or another element of relevance, such as a network slice, a portion of a network slice, a QoS flow, a packet data unit (PDU) session of a QoS flow, a radio bearer, a mapping between portions of network slices, and/or other virtual, logical, or physical resources pertaining to a network, a network device, a network slice, and so forth. As described herein, the metric information may be used to calculate various values of various parameters. The metric information may pertain to a certain time period and/or include timestamp information. Collector 205 may obtain the metric information over time and in a real-time manner.

Estimator 207 may include logic that calculates values of parameters relating to performance metrics and/or other types of metrics based on the collected metric information, as described herein. The values may relate to latency, throughput, error rate, reliability, packet loss, guaranteed flow bit rate (GFBR), guaranteed bit rate (GBR), non-GBR, maximum/minimum bit rate, response time, channel quality indicator (CQI), signal-to-noise ratio (SNR), a QoS Class Identifier (QCI) (e.g., 5G, LTE, etc.), Access Point Name-Aggregate Maximum Bit Rate (APN-AMBR), a UE-AMBR, Reflective QoS Attribute (RQA), Packet Delay Budget, priority level, Maximum Data Burst Volume (MDBV), and/or another type of key performance indicator (KPI), Quality of Experience (QoE), QoS, SLA, and/or Mean Opinion Score (MOS), for example. Estimator 207 may calculate other types of values relating to end device 130 (e.g., mobility, location, speed, velocity, etc.), level of congestion in a network, at a network device, within a network slice or a portion of a network slice, etc., and/or other context information associated with a network, a network slice, a network device, and so forth. As an example, estimator 207 may obtain throughput data over a time period (e.g., every T seconds of a time window) from collector 205, and estimator 207 may calculate an average throughput value from the time series data.

Predictor 209 may include logic that uses the calculated values and parameters to calculate prospective values applicable to a future time period. For example, predictor 209 may calculate a predicted value for throughput based on the calculated value for throughput provided by estimator 207. Predictor 209 may include one or multiple algorithms and/or use various technologies (e.g., artificial intelligence (AI), machine learning (ML), deep learning (DL), predictive analytics, predictive modeling, and/or the like). According to another example, predictor 209 may calculate a prospective average throughput value for the future time period based on various methods, such as moving average, exponential weighted moving average (EWMA), autoregressive integrated moving average (ARIMA), and/or other type of ML/DL technique. Predictor 209 may use other historical information of relevance to calculate a predictive value for a future time period. Predictor 209 may provide the predictive values associated with the metrics and/or parameters to other components of NSMS 119.

Resource analyzer 212 may include logic that may predict resources to allocate for a future time period and allocate the predicted resources for use by networks and network slices. As illustrated, resource analyzer 212 may include a predictor 215 and an allocator 217. Predictor 215 may include logic that calculates prospective resource values applicable to a future time period and of relevance to network slices. For example, predictor 215 may calculate predicted resource values pertaining to physical resources, virtual resources, and logical resources such as processor, memory, storage, communication interface, links, bandwidth, radio, network slice, portion of a network slice, and other elements associated with access network 105, core network 120, and possibly external network 115. Predictor 215 may consider various utilization, load, and available resource values associated with the resources. Predictor 215 may include one or multiple algorithms and/or use various technologies, as described herein, to compute predicted resource values. Predictor 215 may use predicted values of metric analyzer for calculation of predicted resource values. Allocator 217 may include logic that may allocate the predicted resources values to a network slice portion. The allocation of the resources may relate to access network 105, external network 115, and core network 120 and associated network slices. The prediction and allocation of resources for a network slice may be performed in real-time.

Although not illustrated, according to an exemplary embodiment, predictor 215 may include network-specific predictors, such as a RAN predictor, a core network predictor, external network predictor, and allocator 217 may include a RAN allocator, a core network allocator, and an external network allocator. In this way, different networks that may support respective portions of the network slice may be configured with network-specific methods for predicting and allocating resources of various types and relevant to a particular network.

Network slice profiler 220 may include logic that provides a set of profiles for each network slice such that vertical services with the same or similar profiles may be grouped as a network slice. According to various exemplary embodiments, network slice profiler 220 may define a network slice according to various criteria, such as use case (e.g., enhanced Mobile Broadband (eMBB), ultra-reliable low-latency communication (URLLC), massive IoT (mIoT), etc.), performance metrics and values (e.g., reliability, throughput, latency, availability, etc.), and/or application service categories. As illustrated, network slice profiler 220 may include a RAN slice profiler 223, a core slice profiler 225, and an application layer slice profiler 227. According to other exemplary embodiments, network slice profiler 220 may include additional, different, and/or fewer slice profilers.

RAN slice profiler 223 may define or provide network service profiles, templates, network slice subnet instances (NSSIs), service descriptors, and/or slice service type (SST) values for RAN slices. Core slice profiler 225 may define or provide network service profiles, templates, NSSIs, service descriptors, and/or SST values for core network slices. Application slice profiler 227 may define or provide network service profiles, templates, NSSIs, service descriptors, and/ or SST values for external network slices. Although not illustrated, network slice profiler 220 may store profiles for vertical services. For example, the vertical service profiles may indicate performance metrics, SLA requirements, QoS requirements, and/or other attributes of the vertical services that may assist in the mapping service.

Mapper 230 may include logic that maps and/or assigns vertical services into the sub-network slices (e.g., RAN slices, core slices, etc.), as described herein. As illustrated, network slice mapper 230 may include a mapper manager 233, a RAN slice mapper 235, a core slice mapper 237, and an application layer slice mapper 239. According to other exemplary embodiments, additional, different, and/or fewer mappers may be implemented. For example, a transport or intermediary network slice mapper may be implemented. Alternatively, for example, application layer network slice mapper 239 may be omitted.

Mapper manager 233 may include logic that provides a pairing service. For example, mapper manager 233 may pair a RAN slice with a core slice. According to another example, mapper manager 233 may pair a vertical service with the core slice and the RAN slice. According to an exemplary embodiment, mapper manager 233 may perform the pairing service based on one or multiple criteria, such as SLA requirements, QoS requirements, metric parameters and values, an operator's requirements, and/or other type of configurable criterion.

RAN slice mapper 235 may include logic that maps a vertical service to a RAN slice. The RAN slice may have the same or similar network service profile relative to other RAN slices and/or the vertical service and vice versa. As previously described, the end-to-end network slice management service may map vertical services to RAN slices according to a K:L mapping.

Core slice mapper 237 may include logic that maps a vertical service to a core network slice. The core network slice may have the same or similar network service profile relative to other core network slices and/or the vertical service and/or the RAN slice. As previously described, the end-to-end network slice management service may map the vertical service to the core slice according to a K:M mapping.

Application layer slice mapper 239 may include logic that maps a vertical service to an application layer network slice. The application layer network slice may have the same or similar network service profile relative to other application layer network slices, the vertical service, the core network slice, and/or the RAN slice. As previously described, the end-to-end network slice management service may map the vertical service to an application layer network slice according to a K:N mapping. A further description of the mapping services of the end-to-end network slice management service is provided below.

Figure 3:
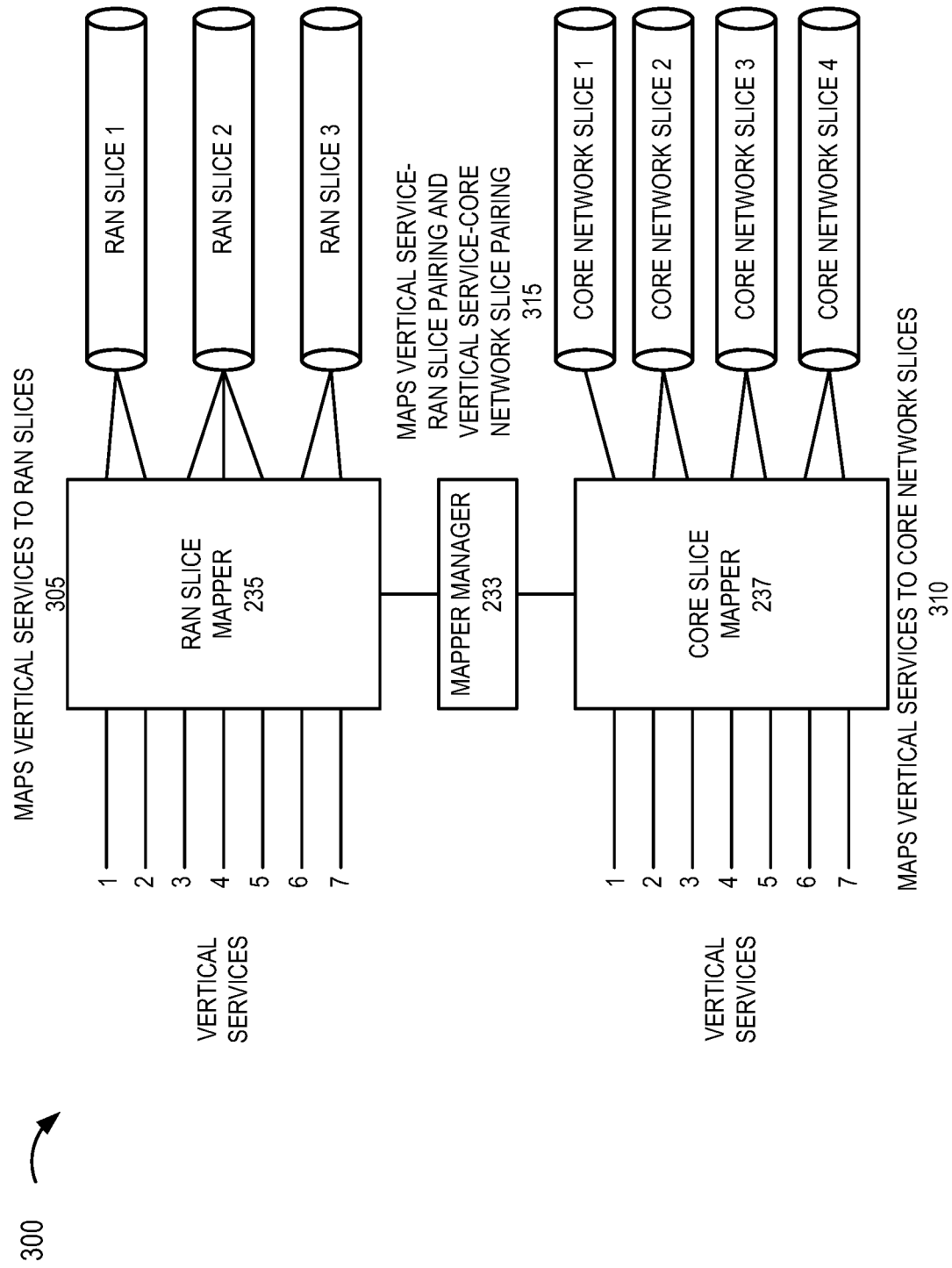
FIG. 3 is a diagram illustrating an exemplary process of a mapping service.

FIG. 3 is a diagram illustrating an exemplary embodiment of the mapping service according to an exemplary scenario. As illustrated, assume that the K:L:M mapping corresponds to K=7 vertical services, L=3 RAN slices, and M=4 core network slices. According to an exemplary process 300, RAN slice mapper 235 may map vertical services to RAN slices 305. For example, RAN slice mapper 235 may provide a K:L mapping between the vertical services (e.g., vertical services 1-7) to the RAN slices (e.g., RAN slices 1, 2, and 3). Additionally, core slice mapper 237 may map vertical services to core network slices 310. For example, core slice mapper 237 may provide a K:M mapping between the vertical services (e.g., vertical services 1-7) to the core network slices (e.g., core network slices 1, 2, 3, and 4). Mapper manager 233 may map the vertical service-RAN slice pairings and the vertical service-core network slice pairings 315. For example, mapper manager 233 may provide a K:L:M mapping between the vertical services and the RAN and the core network slices. Mapper manager 233 may identify common vertical services between the RAN and core slice pairings. Additionally, mapper manager 233 may determine suitable connectivity factors between RAN and core slices based on geography, communication links between access devices 107 and core devices 122, and other considerations associated with the network slice pairings.

According to other exemplary embodiments, additional and/or different networks may be implemented such that additional and/or different vertical services-to-network slice mappings may be implemented. Further, mapper manager 233 may map additional and/or different vertical services-to-network slice pairings.

Referring back to FIG. 2, as illustrated, network slice resource scheduler 240 may include a RAN scheduler 243, a core scheduler 245, and an application layer scheduler 247. According to other exemplary embodiments, network slice resource scheduler 240 may include additional (e.g., transport network scheduler, etc.), fewer (e.g., omit application layer scheduler 247, etc.), and/or different network schedulers.

Network slice resource scheduler 240 may include logic that schedules and assigns the required resources to network slices for the future time period. Network slice resource scheduler 240 may calculate the scheduling and assignment of the resources based on information output from resource analyzer 212 and network slice mapper 230.

RAN scheduler 243 may include logic that schedules and assigns the required resource to network slices of access network 105. For example, RAN scheduler 243 may schedule and assign network resources of access network 105 according to TDM, FDM, SDM, or some combination of these methodologies to support a fair allocation of the resources to the RAN slices. RAN scheduler 243 may schedule and assign resources for RAN slices according to SLA requirements, QoS requirements, metric requirements, and/or other criterion pertaining to access network 105, which may or may not be different from other networks (e.g., core network 120, etc.).

Core scheduler 245 may include logic that schedules and assigns the required resource to network slices of core network 120. For example, core scheduler 245 may schedule and assign network resources of core network 120 according to FIFO, round-robin, DRR, WRR, WFQ, SFQ, other well-known techniques, or some combination of these methodologies to support a fair allocation of the resources to the core network slices. Core scheduler 245 may schedule and assign resources for core network slices according to SLA requirements, QoS requirements, metric requirements, and/or other criterion pertaining to core network 120, which may or may not be different from other networks (e.g., access network 105, etc.).

Application layer scheduler 247 may include logic that schedules and assigns the required resource to network slices of external network 115. For example, application layer scheduler 247 may schedule and assign network resources of external network 115 according to FIFO, round-robin, DRR, WRR, WFQ, SFQ, other well-known techniques, or some combination of these methodologies to support a fair allocation of the resources to the core network slices. Application layer scheduler 247 may schedule and assign resources for application layer network slices according to SLA requirements, QoS requirements, metric requirements, and/or other criterion pertaining to external network 115, which may or may not be different from other networks.

Figure 4:
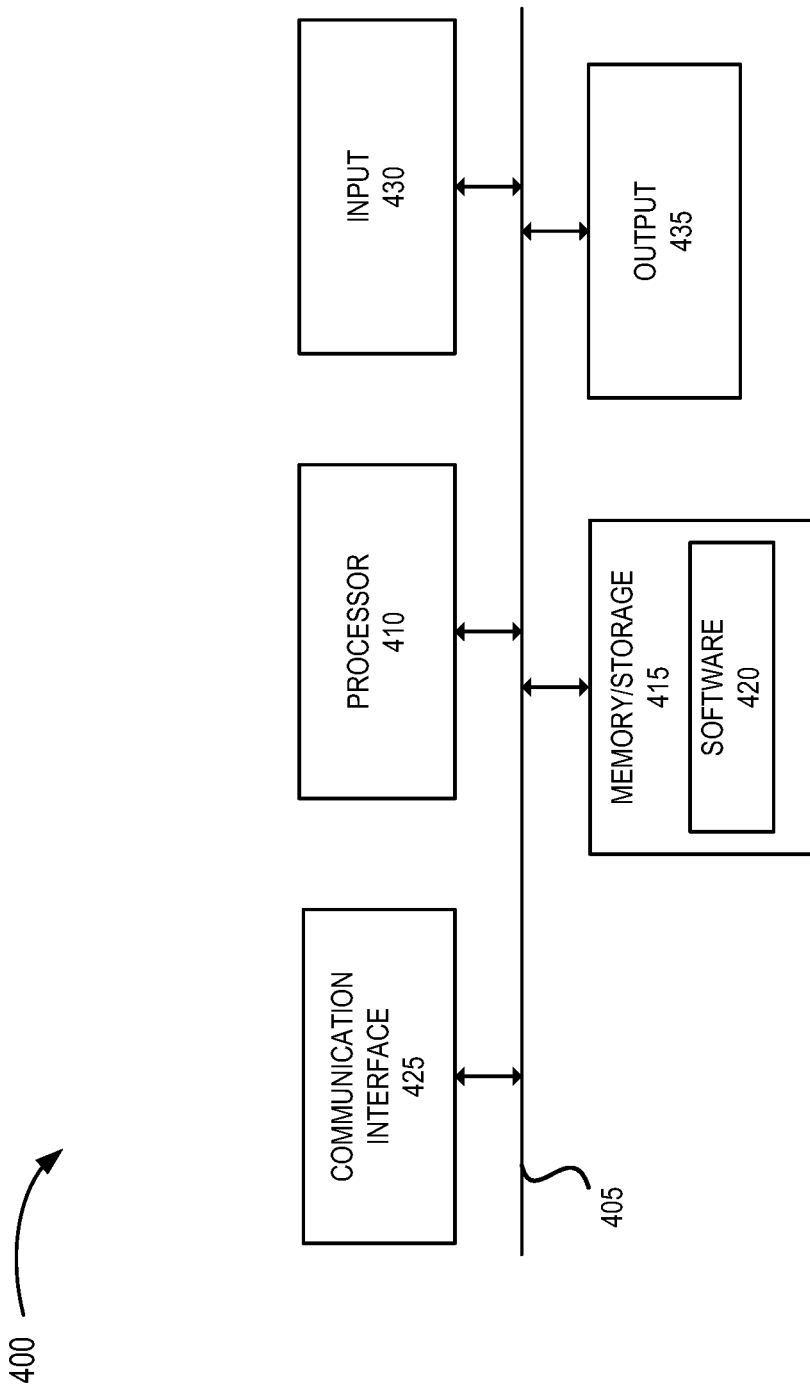
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access device 107, external device 117, core device 122, end device 130, NSMS 119, metric analyzer 203, resource analyzer 212, network slice profiler 220, network slice mapper 230, network slice resource scheduler 240 and/or other types of components (e.g., collector 205, predictor 215, core slice profiler 225, etc.), as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to NSMS 119, software 420 may include an application that, when executed by processor 410, provides a function and/or a process of the metric predictor service, the resource predictor service, the mapping service, the network slice profile service, and/or the resource scheduler service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
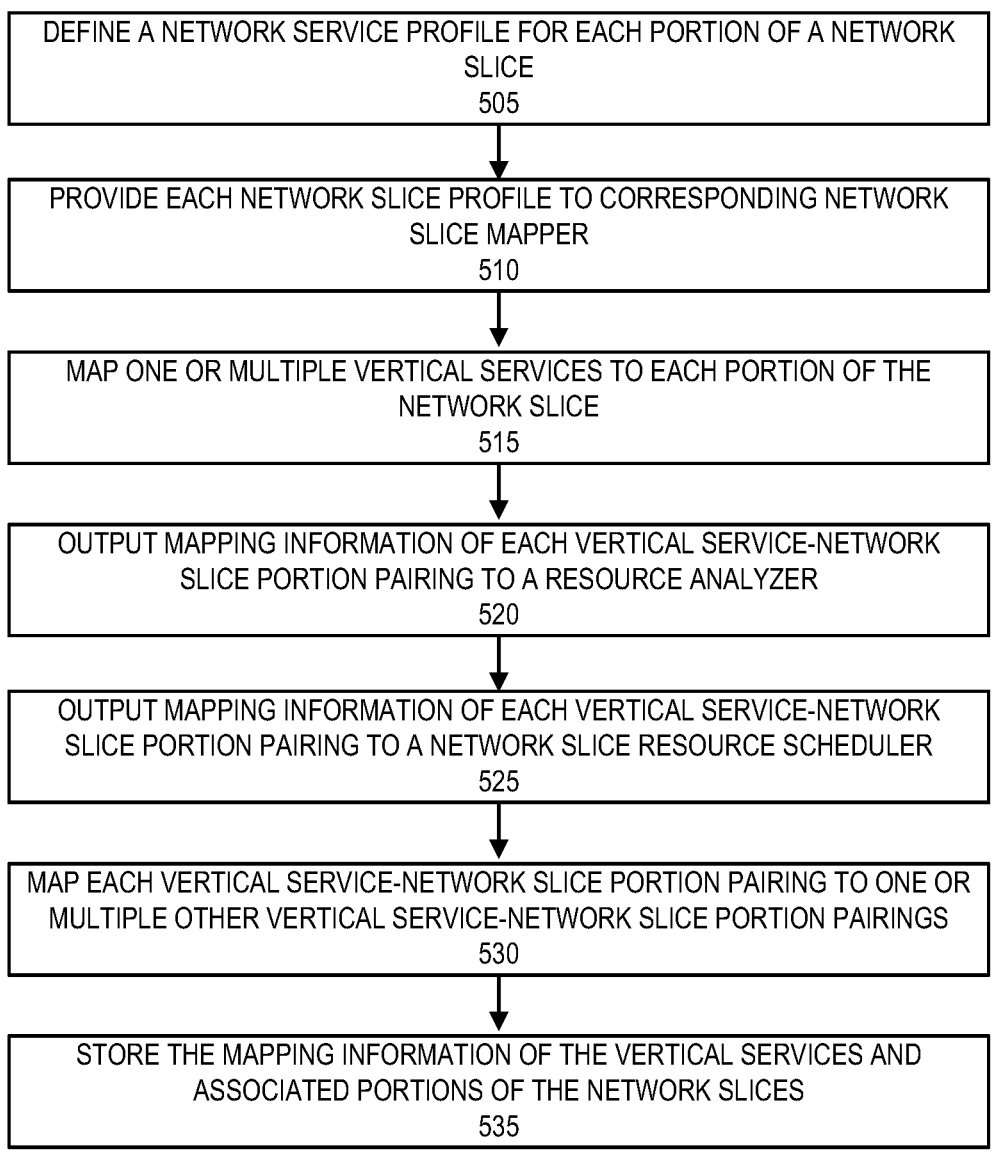
FIG. 5 is a flow diagram illustrating an exemplary process of an exemplary embodiment of the end-to-end network slice management service.

FIG. 5 is a flow diagram illustrating an exemplary process 500 of an exemplary embodiment of the end-to-end network slice management service. According to an exemplary embodiment, NSMS 119 or network slice profiler 220 and network slice mapper 230 may perform a step of process 500. According to an exemplary implementation, processor 410 executes software 420 to perform the step of process 500, as described herein. Alternatively, the step may be performed by execution of only hardware.

In block 505, NSMS 119 may define a network service profile for each portion of a network slice. For example, RAN slice profiler 223 and core slice profiler 225 may define or provide network service templates, NSSIs, service descriptors, and/or SST value for access network 105 and core network 120, respectively. According to other exemplary embodiments, additional or different slice profilers relative to additional or different networks may be implemented, as described herein.

Operators and/or administrators, for example, may define profile-based slices for the RAN, the core network, and additional networks in a dynamic manner, and this may make the system flexible so as to meet the requirements of the dynamic nature of networks slices. NSMS 119 may check for update on a regular basis (e.g., time T), and, if needed, profile-based slices may be updated. In order to reduce signaling overhead and complexity associated with the updates on the profile-based slices, however, the profile update should be less than a scheduling time (e.g., time S) for users; that is, T>S.

In block 510, NSMS 119 may provide each network slice profile to a corresponding network slice mapper. For example, RAN slice profiler 223 and core slice profiler 225 may provide respective network service profiles to corresponding RAN slice mapper 235 and core slice mapper 237. According to other exemplary embodiments, additional or different slice profilers relative to additional or different networks may be provided to other types of network mappers, as described herein.

In block 515, NSMS 119 may map one or multiple vertical services to each portion of the network slice. For example, RAN slice mapper 235 may map a vertical service with a same or similar profile into a same RAN slice. Additionally, for example, core slice mapper 237 may map a vertical service with a same or similar profile into a same core network slice. RAN slice mapper 235 and core slice mapper 237 may each generate mapping information indicating the mapping (e.g., assignment) of the vertical service to a network slice portion. According to other exemplary embodiments, additional or different network slices may be mapped to vertical services, as described herein.

In block 520, NSMS 119 may output mapping information of each vertical service-network slice portion pairing to a resource analyzer of NSMS 119. For example, RAN slice mapper 235 may provide mapping information to a RAN predictor of resource analyzer 212. Additionally, for example, core slice mapper 237 may provide mapping information to a core network predictor of resource analyzer 212. According to other exemplary embodiments, additional or different mapping information may be provided to additional or different network predictors (e.g., an application layer network predictor, etc.), as described herein.

In block 525, NSMS 119 may output mapping information of each vertical service-network slice portion pairing to a network slice resource scheduler of NSMS 119. For example, RAN slice mapper 235 may provide mapping information to RAN scheduler 243 of network slice resource scheduler 240. Additionally, for example, core slice mapper 237 may provide mapping information to core scheduler 245 of network slice resource scheduler 240. According to other exemplary embodiments, additional or different mapping information may be provided to additional or different network schedulers (e.g., an application layer network, transport network, etc.), as described herein.

In block 530, NSMS 119 may map each vertical service-network slice portion pairing to one or multiple other vertical service-network slice portion pairings. For example, mapper manager 233 of network slice mapper 230 may map a RAN slice to a vertical service pairing with a core network slice to the vertical service pairing, as described herein. According to other exemplary embodiments, additional or different pairings may be mapped together to form an end-to-end network slice, as described herein.

In block 535, NSMS 119 may store the mapping information of the vertical services and associated portions of the network slices. For example, mapper manager 233 may store the mappings between vertical services, RAN slices, and core network slices pairings, as described herein. According to other exemplary embodiments, additional or different mapping information may be stored relative to application layer slices and so forth, as described herein.

FIG. 5 illustrates an exemplary embodiment of a process of the end-to-end network slice management service, however according to other exemplary embodiments, the end-to-end network slice management service may perform additional operations, fewer operations, and/or different operations than those illustrated and described.

Figure 6:
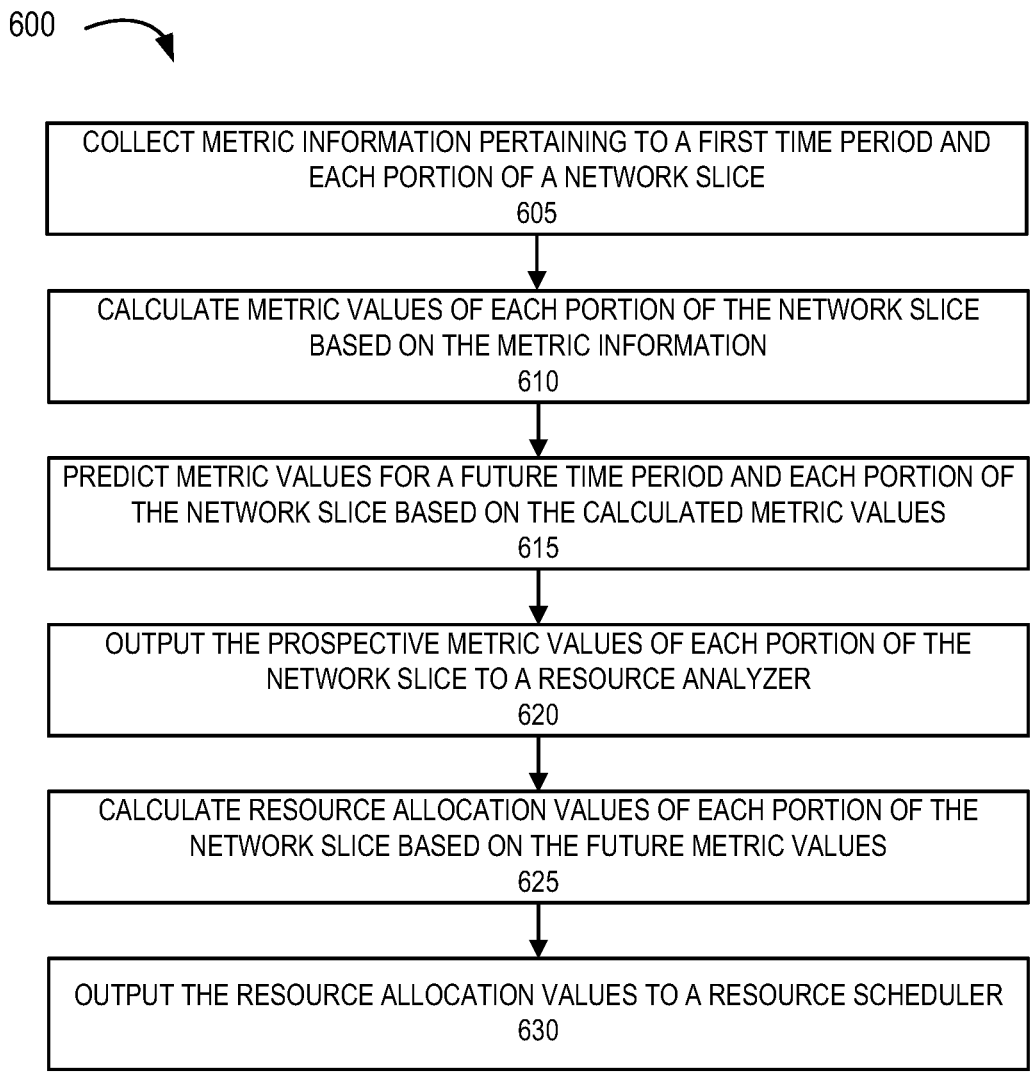
FIG. 6 is a flow diagram illustrating another exemplary process of an exemplary embodiment of the end-to-end network slice management service.

FIG. 6 is a flow diagram illustrating an exemplary process 600 of an exemplary embodiment of the end-to-end network slice management service. According to an exemplary embodiment, NSMS 119 or metric analyzer 203 and resource analyzer 212 may perform a step of process 600. According to an exemplary implementation, processor 410 executes software 420 to perform the step of process 600, as described herein. Alternatively, the step may be performed by execution of only hardware.

In block 605, NSMS 119 may collect metric information pertaining to a first time period and each portion of a network slice. For example, collector 205 of metric analyzer 203 may obtain and ingest metric information pertaining to a network, a network device, a communication link, end device 130, and/or another element of relevance, such as a network slice or a portion of a network slice, as described herein.

In block 610, NSMS 119 may calculate metric values of each portion of the network slice based on the metric information. For example, estimator 207 may calculate values of parameters relating to performance metrics and/or other types of metrics based on the collected metric information, as described herein. By way of further example, the metric values may relate to latency, throughput, reliability, error rate, QoE, SLA, mobility of end device 130, level of congestion, and/or other context information, as described herein. The metric values may relate to access network 105, external network 115, core network 120, and/or another type of network that may support a network slice portion, as described herein.

In block 615, NSMS 119 may predict metric values for a future time period and each portion of the network slice based on the calculated metric values. For example, predictor 209 of metric analyzer 203 may calculate prospective metric values based on the calculated metric values relating to a different time period, as described herein. The prospective metric values may relate to access network 105, external network 115, core network 120, and/or another type of network that may support a network slice portion, as described herein.

In block 620, NSMS 119 may output the prospective metric values of each portion of the network slice to resource analyzer 212 of NSMS 119. For example, metric analyzer 203 may provide the prospective metric values to resource analyzer 212.

In block 625, NSMS 119 may calculate resource allocation values of each portion of the network slice based on the future metric values. For example, a RAN predictor of predictor 215 and resource analyzer 212 may calculate resource allocation values pertaining to access network 105 and an associated future time period. Additionally, for example, a core network predictor of predictor 215 and resource analyzer 212 may calculate resource allocation values pertaining to core network 120 and an associated future time period. NSMS 119 may calculate resource allocation values pertaining to other networks, as described herein. Allocator 217 may allocate the resource allocation values to respective network slice portions (e.g., RAN slice, core network slice, etc.), as described herein.

In block 630, NSMS 119 may output the resource allocation values to a resource scheduler of NSMS 119. For example, resource analyzer 212 may provide resource allocation values that are allocated to a RAN slice to RAN scheduler 243 of network slice resource scheduler 240. Additionally, for example, resource analyzer 212 may provide resource allocation values that are allocated to a core network slice to core scheduler 245 of network slice resource scheduler 240. According to other exemplary embodiments, additional or different types of resource allocation values may be provided to an additional or different type of network scheduler, as described herein.

FIG. 6 illustrates an exemplary embodiment of a process of the end-to-end network slice management service, however according to other exemplary embodiments, the end-to-end network slice management service may perform additional operations, fewer operations, and/or different operations than those illustrated and described.

Figure 7:
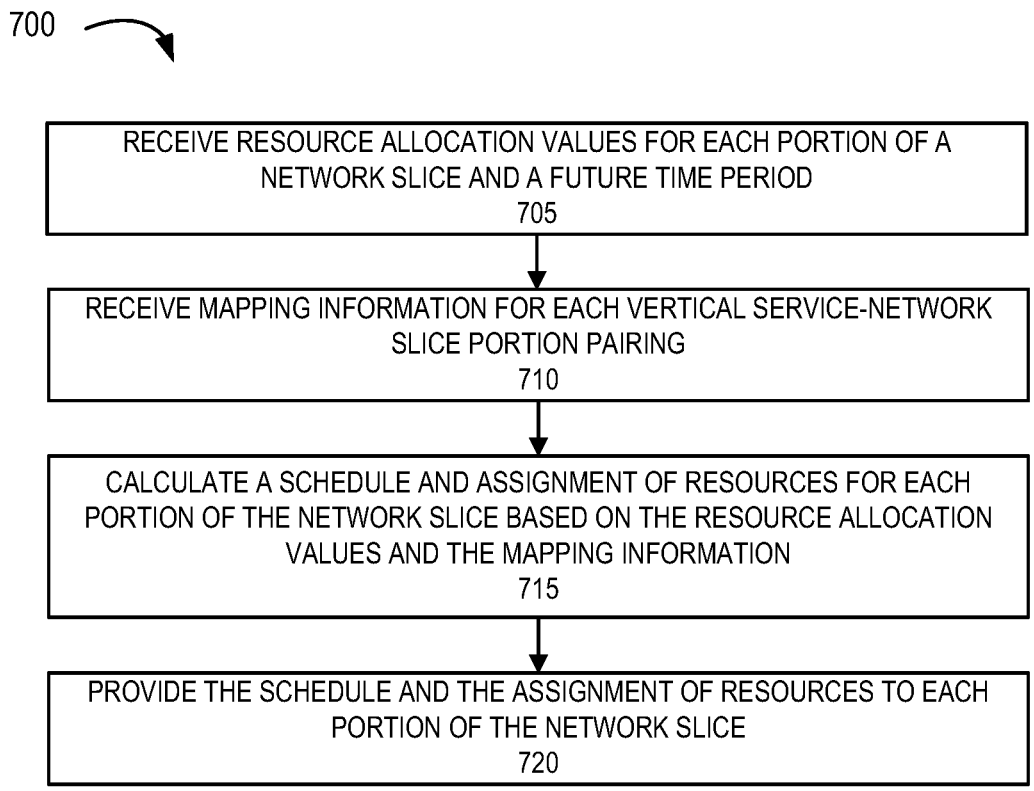
FIG. 7 is a flow diagram illustrating yet another exemplary process of an exemplary embodiment of the end-to-end network slice management service.

FIG. 7 is a flow diagram illustrating an exemplary process 700 of an exemplary embodiment of the end-to-end network slice management service. According to an exemplary embodiment, NSMS 119 or network slice resource scheduler 240 may perform a step of process 700. According to an exemplary implementation, processor 410 executes software 420 to perform the step of process 700, as described herein. Alternatively, the step may be performed by execution of only hardware.

In block 705, NSMS 119 may receive resource allocation values for each portion of a network slice and a future time period. For example, RAN scheduler 243 of network slice resource scheduler 240 may receive resource allocation values pertaining to access network 105 from resource analyzer 212. Additionally, for example, core scheduler 245 may receive resource allocation values pertaining to core network 120 from resource analyzer 212. According to other exemplary embodiments, network slice resource scheduler 240 may receive resource allocation values pertaining to other networks, as described herein.

In block 710, NSMS 119 may receive mapping information for each vertical service-network slice portion pairing. For example, network slice resource scheduler 240 may receive mapping information of vertical service, RAN slice, core network slice, and other network slice (e.g., application layer network slice, transport network slice, etc.) pairings, as described herein.

In block 715, NSMS 119 may calculate a schedule and assignment of resources for each portion of the network slice based on the resource allocation values and the mapping information. For example, RAN scheduler 243 may calculate a schedule and an assignment of resources for a RAN portion of a network slice. Additionally, for example, core scheduler 245 may calculate a schedule and an assignment of resources for a core network portion of the network slice. According to other exemplary embodiments, additional or different schedules and assignments of resources may be calculated that relate to other networks, as described herein.

In block 720, NSMS 119 may provide the schedule and the assignment of resources to each portion of the network slice. For example, network slice resource scheduler 240 may provide the schedule and the assignment of resources to various networks that support the network slice, such as access network 105, core network 120, and/or other networks (e.g., external network 115, etc.).

FIG. 7 illustrates an exemplary embodiment of a process of the end-to-end network slice management service, however according to other exemplary embodiments, the end-to-end network slice management service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    calculating, by a network device, prospective metric values pertaining to a network slice of multiple networks;
    generating, by the network device based on profiles pertaining to the multiple networks, mapping information that indicates a pairing between an application service and each network of the multiple networks that is associated with a portion of the network slice, and an end-to-end pairing of the network slice that includes pairings between the application service and the multiple networks;
    calculating, by the network device based on the prospective metric values and the mapping information, resource allocation values pertaining to the multiple networks of the network slice;
    calculating, by the network device, a schedule and an assignment of resources for the network slice based on the resource allocation values and the mapping information; and
    transmitting, by the network device, the schedule and the assignment of the resources to the multiple networks.

2. The method of claim 1, wherein the mapping information includes a K:L mapping between the application service and a radio access network (RAN) slice and a K:M mapping between the application service and a core network slice, and the end-to-end pairing of the network slice includes a K:L:M mapping between the application service, the RAN slice, and the core network slice, and wherein the K:L:M mapping is not a 1:1:1 mapping.

3. The method of claim 1, further comprising:
    estimating, by the network device based on metric information, metric values pertaining to the multiple networks of the network slice, and wherein the calculating the prospective metric values further comprises:
    calculating, by the network device based on the metric values, the prospective metric values pertaining to the multiple networks of the network slice.

4. The method of claim 3, wherein the multiple networks include a radio access network, a core network, and an application layer network that provides the application service, and the metric values relate to performance metrics and one or more values pertaining to an end device.

5. The method of claim 1, wherein each of the profiles define at least two of a network slice subnet instance, a service descriptor, or a slice service type value pertaining to one of the multiple networks.

6. The method of claim 1, wherein the mapping information includes a K:L mapping between the application service and a radio access network (RAN) slice, a K:M mapping between the application service and a core network slice, and a K:N mapping between the application service and an application layer network slice, wherein the end-to-end pairing of the network slice includes a K:L:M:N mapping between the application service, the RAN slice, the core network slice, and the application layer network slice, and wherein the K:L:M:N mapping is not a 1:1:1:1 mapping.

7. The method of claim 1, wherein the network slice provides the application service to end devices, and the application service includes multiple application services that differ in terms of at least one of performance requirements or service level agreement requirements.

8. The method of claim 7, wherein the profiles include profiles pertaining to the application services.

9. A network device comprising:
    a processor configured to:
        calculate prospective metric values pertaining to a network slice of multiple networks;
        generate based on profiles pertaining to the multiple networks, mapping information that indicates a pairing between an application service and each network of the multiple networks that is associated with a portion of the network slice, and an end-to-end pairing of the network slice that includes pairings between the application service and the multiple networks;
        calculate based on the prospective metric values and the mapping information, resource allocation values pertaining to the multiple networks of the network slice;
        calculate a schedule and an assignment of resources for the network slice based on the resource allocation values and the mapping information; and
        transmit the schedule and the assignment of the resources to the multiple networks.

10. The network device of claim 9, wherein the mapping information includes a K:L mapping between the application service and a radio access network (RAN) slice and a K:M mapping between the application service and a core network slice, and the end-to-end pairing of the network slice includes a K:L:M mapping between the application service, the RAN slice, and the core network slice, and wherein the K:L:M mapping is not a 1:1:1 mapping.

11. The network device of claim 9, wherein the processor is further configured to:
    estimate based on metric information, metric values pertaining to the multiple networks of the network slice, and wherein calculating the prospective metric values, the processor is further configured to:
    calculate based on the metric values, the prospective metric values pertaining to the multiple networks of the network slice.

12. The network device of claim 11, wherein the multiple networks include a radio access network, a core network, and an application layer network that provides the application service, and the metric values relate to performance metrics and one or more values pertaining to an end device.

13. The network device of claim 9, wherein each of the profiles define at least two of a network slice subnet instance, a service descriptor, or a slice service type value pertaining to one of the multiple networks.

14. The network device of claim 9, wherein the mapping information includes a K:L mapping between the application service and a radio access network (RAN) slice, a K:M mapping between the application service and a core network slice, and a K:N mapping between the application service and an application layer network slice, wherein the end-to-end pairing of the network slice includes a K:L:M:N mapping between the application service, the RAN slice, the core network slice, and the application layer network slice, and wherein the K:L:M:N mapping is not a 1:1:1:1 mapping.

15. The network device of claim 9, wherein the network slice provides the application service to end devices, and the application service includes multiple application services that differ in terms of at least one of performance requirements or service level agreement requirements.

16. The network device of claim 15, wherein the profiles include profiles pertaining to the application services.

17. A non-transitory computer-readable storage medium storing instructions executable by a processor of a network device of a radio access network, which when executed cause the network device to:
    calculate prospective metric values pertaining to a network slice of multiple networks;
    generate based on profiles pertaining to the multiple networks, mapping information that indicates a pairing between an application service and each network of the multiple networks that is associated with a portion of the network slice, and an end-to-end pairing of the network slice that includes pairings between the application service and the multiple networks;
    calculate based on the prospective metric values and the mapping information, resource allocation values pertaining to the multiple networks of the network slice;
    calculate a schedule and an assignment of resources for the network slice based on the resource allocation values and the mapping information; and
    transmit the schedule and the assignment of the resources to the multiple networks.

18. The non-transitory computer-readable storage medium of claim 17, wherein the mapping information includes a K:L mapping between the application service and a radio access network (RAN) slice and a K:M mapping between the application service and a core network slice, and the end-to-end pairing of the network slice includes a K:L:M mapping between the application service, the RAN slice, and the core network slice, and wherein the K:L:M mapping is not a 1:1:1 mapping.

19. The non-transitory computer-readable storage medium of claim 17, wherein the mapping information includes a K:L mapping between the application service and a radio access network (RAN) slice, a K:M mapping between the application service and a core network slice, and a K:N mapping between the application service and an application layer network slice, wherein the end-to-end pairing of the network slice includes a K:L:M:N mapping between the application service, the RAN slice, the core network slice, and the application layer network slice, and wherein the K:L:M:N mapping is not a 1:1:1:1 mapping.

20. The non-transitory computer-readable storage medium of claim 17, wherein the network slice provides the application service to end devices, and the application service includes multiple application services that differ in terms of at least one of performance requirements or service level agreement requirements.

* * * * *